(12) United States Patent
Nishiguchi

(10) Patent No.: US 8,714,195 B2
(45) Date of Patent: May 6, 2014

(54) FLUID CONTROL VALVE

(75) Inventor: Hiroki Nishiguchi, Otsu (JP)

(73) Assignee: Shimadzu Corporation, Kyoto (JP)

( * ) Notice: Subject to any disclaimer, the term of this patent is extended or adjusted under 35 U.S.C. 154(b) by 1009 days.

(21) Appl. No.: 12/438,461

(22) PCT Filed: Sep. 4, 2006

(86) PCT No.: PCT/JP2006/317481
§ 371 (c)(1),
(2), (4) Date: Feb. 23, 2009

(87) PCT Pub. No.: WO2008/029443
PCT Pub. Date: Mar. 13, 2008

(65) Prior Publication Data
US 2009/0250646 A1    Oct. 8, 2009

(51) Int. Cl.
*F15B 13/04* (2006.01)
*F16K 11/07* (2006.01)

(52) U.S. Cl.
CPC ......... *F15B 13/0417* (2013.01); *F15B 13/0405* (2013.01); *F15B 2211/30515* (2013.01); *F16K 11/0716* (2013.01)
USPC ................... 137/596.17; 137/625.68; 91/445; 91/447

(58) Field of Classification Search
CPC .. F15B 13/04; F15B 13/0405; F15B 13/0402; F15B 13/0417; F15B 13/044; F15B 13/0445; F15B 2211/30515; F15B 13/01; F16K 31/0613; F16K 11/0716

USPC ......... 137/596, 596.17, 596.1, 596.2, 625.68; 91/420, 445–447
See application file for complete search history.

(56) References Cited

U.S. PATENT DOCUMENTS
5,048,395 A    9/1991 Ohshima

FOREIGN PATENT DOCUMENTS

| JP | 59-019778 A | 2/1984 |
|---|---|---|
| JP | 63-195105 U | 12/1988 |
| JP | 01-69902 U | 5/1989 |
| JP | 01-96502 U | 6/1989 |
| JP | 04-42901 U | 4/1992 |
| JP | 2002-286002 A | 10/2002 |
| JP | 3115605 U | 9/2005 |

*Primary Examiner* — Craig Schneider
(74) *Attorney, Agent, or Firm* — Sughrue Mion, PLLC

(57) ABSTRACT

A fluid control valve wherein a main valve body includes: a high-pressure passage providing communication between a suction port and a sleeve in which a spool is fitted; a tank passage providing communication between a discharge port and the sleeve; a lift lock poppet located between the sleeve and a cylinder port and assuming an open position for providing communication between the sleeve and the cylinder port; a hydraulic fluid discharge passage providing communication between a back-pressure chamber provided within the lift lock poppet and the sleeve; a hydraulic fluid delivery passage located between the sleeve and the lift lock poppet; a cylinder passage located between the lift lock poppet and the cylinder port that communicates with the hydraulic fluid delivery passage when the lift lock poppet is in the open position, and a communication passage providing communication between the hydraulic fluid discharge passage and the hydraulic fluid delivery passage.

2 Claims, 2 Drawing Sheets

FLUID CONTROL VALVE

TECHNICAL FIELD

The present invention relates to a fluid control valve configured to change a flow channel of fluid by displacing a spool within a main valve body, thereby controlling supply of fluid to a lift cylinder and discharge of fluid.

BACKGROUND ART

FIG. 3 is a sectional side elevational view illustrating an arrangement of a conventional fluid control valve configured to change a flow channel of fluid by displacing a spool within a main valve body, thereby controlling supply of fluid to a lift cylinder and discharge of fluid, and FIG. 4 is a sectional view taken on line X-X of FIG. 3.

Specifically, the fluid control valve BB illustrated includes: a main valve body 1 having a sleeve 6 to which a suction port 3 for sucking hydraulic fluid, a discharge port 4 for discharging hydraulic fluid and a cylinder port 5 for delivering hydraulic fluid to a lift cylinder C are connected, an electromagnetic solenoid valve 7 for opening and closing the flow channel between the cylinder port 5 and the discharge port 4, and an operate check valve 8 located between the sleeve 6 and the cylinder port 5 and having a lift lock poppet 9 therewithin for opening and closing the flow channel therebetween; and a spool 2 expandably and retractably fitted in the sleeve 6 and capable of selectively assuming a lifting position for providing communication between the cylinder port 5 and the suction port 3 to form a flow channel of hydraulic fluid, a lowering position for providing communication between the cylinder port 5 and the discharge port 4 to form a flow channel of hydraulic fluid, and a neutral position for shutting off the flow channels between these ports.

The spool 2 is formed with first to third annular grooves 2a to 2c while being connected to a non-illustrated operating lever via a non-illustrated link mechanism, so as to be capable of selectively assuming the lifting position, the lowering position and the neutral position.

Around the sleeve 6 of the main valve body 1, there are formed a high-pressure passage 11 connected to the suction port 3, a tank passage 12 connected to the discharge port 4, a hydraulic fluid delivery passage 13 which communicates with the high-pressure passage 11 via the first annular groove 2a when the spool 2 assumes the lifting position and which communicates with the tank passage 12 via the first annular groove 2a when the spool 2 assumes the lowering position, and a hydraulic fluid discharge passage 14 which communicates with the tank passage 12 via the third annular groove 2c when the spool 2 assumes the lowering position. The electromagnetic solenoid valve 7, which is located above the hydraulic fluid discharge passage 14, is always open during operation. The hydraulic fluid discharge passage 14 extends from the operate check valve 8 to the sleeve 6.

The operate check valve 8 includes the aforementioned lift lock poppet 9, and a plug 8a accommodating the lift lock poppet 9 therein. The lift lock poppet 9 is movable between an open position for providing communication between the cylinder port 5 and the hydraulic fluid delivery passage 13 and a shutoff position for shutting off the communication between the cylinder port 5 and the hydraulic fluid delivery passage 13. The lift lock poppet 9 has a back-pressure chamber 9a provided therewithin and an orifice 9b located at the outer periphery thereof for providing communication between the back-pressure chamber 9a and the outside. The back-pressure chamber 9a communicates with the hydraulic fluid discharge passage 14. A cylinder passage 15 is provided between the operate check valve 8 and the cylinder port 5. When the lift lock poppet 9 is in the open position, the cylinder passage 15 is allowed to communicate with the hydraulic fluid delivery passage 13. The communication between the cylinder passage 15 and the hydraulic fluid delivery passage 13 is shut off when the lift lock poppet 9 is in the shutoff position.

The high-pressure passage 11 is provided with a load check poppet 20 and a spring 21 for preventing a carriage from sinking due to hydraulic fluid flowing backward from the lift cylinder C to a high-pressure pump just after a carriage lifting operation has started and just before the carriage lifting operation terminates. (See Registered Japanese Utility Model Publication No. 3115605 for example.) Description will be made of operations of respective portions of the fluid control valve BB in moving a lift up and down.

In moving the lift up, the spool 2 is moved rightwardly from the position illustrated (i.e., neutral position). Accordingly, the first annular groove 2a shifts rightwardly to make the high-pressure passage 11 and the hydraulic fluid delivery passage 13 communicate with each other via the first annular groove 2a. As a result, hydraulic fluid from the high-pressure pump pushes the load check poppet 20 open and flows into the hydraulic fluid delivery passage 13 through the high-pressure passage 11, thus applying a high hydraulic fluid pressure to the lift lock poppet 9. When the lift lock poppet 9 is moved upwardly in FIG. 3 by the hydraulic fluid pressure, communication is provided between the hydraulic fluid delivery passage 11 and the cylinder passage 15 to allow hydraulic fluid to be fed to the cylinder port 5 via the cylinder passage 15 (see hydraulic fluid flow (h)). Thus, high-pressure hydraulic fluid is supplied into a bottom chamber C1 of the lift cylinder C, thus moving the lift up. With the lift in this moved-up position, when the spool 2 is moved back into the neutral position, the communication between the hydraulic fluid delivery passage 13 and the high-pressure passage 11 and the communication between the hydraulic fluid delivery passage 13 and the tank passage 12 are shut off. Since the communication between the hydraulic fluid discharge passage 14 and the tank passage 12 remains shut off at that time, the lift cylinder C is kept in the condition described above. Then, the lift lock poppet 9 moves downwardly in FIG. 3 to shut off the communication between the hydraulic fluid delivery passage 13 and the cylinder passage 15.

In moving the lift down, on the other hand, the spool 2 is moved leftwardly. By so doing, the hydraulic fluid discharge passage 14 is allowed to communicate with the tank passage 12 and the discharge port 4 via the third annular groove 2c. That is, the poppet back-pressure chamber 9a of the operate check valve 9 is allowed to communicate with the tank passage 12 to produce a primary hydraulic fluid flow (i). The primary hydraulic fluid flow (i) causes a pressure difference to occur between the cylinder passage 15 and the poppet back-pressure chamber 9a. In turn, the pressure difference causes the lift lock poppet 9 to open by moving upwardly, so that hydraulic fluid in the bottom chamber C1 of the lift cylinder C flows into the tank passage 12 via the hydraulic fluid delivery passage 13 and the first annular groove 2a of the spool 2 to produce a secondary hydraulic fluid flow (j), thereby causing the lift cylinder C to perform a lowering operation. With the lift cylinder in the lowered position, when the spool 2 is moved back into the neutral position, the communication between the hydraulic fluid discharge passage 14 and the tank passage 12 is shut off. As a result, the pressure difference between the cylinder passage 15 and the back-pressure chamber 9a disappears, which allows the lift lock poppet 9 to move into the shutoff position by the spring 9d.

Thus, the communication between the cylinder passage 15 and the hydraulic fluid delivery passage 13 is also shut off.

When the forklift truck is at rest, the electromagnetic solenoid valve 7 is closed because its solenoid is not applied with a voltage. Therefore, the primary hydraulic fluid flow (i) is not produced even when the spool 2 is moved leftwardly. Accordingly, the lift lock poppet 9 fails to open and, hence, the lift fails to move down.

DISCLOSURE OF THE INVENTION

Problems to be Solved by the Invention

With the arrangement described in patent document 1, hydraulic fluid pushes the load check poppet 20 open when hydraulic fluid is introduced from the suction port 3, so that a pressure loss occurs at that time. Recently, there has been a request to improve the energy efficiency by eliminating such a pressure loss. To meet such a request, an arrangement can be conceived such that the load check poppet 20 is eliminated while the lift lock poppet 9 is imparted with the function of the load check poppet also.

However, even if the load check poppet 20 is merely eliminated from the conventional arrangement of the fluid control valve BB, inconveniences occur for the reason stated below.

The lift lock poppet 9 is provided with the orifice 9b having a small diameter at the outer periphery thereof for causing a pressure difference to occur between the cylinder passage 15 and the poppet back-pressure chamber 9a. For this reason, in moving the spool 2 back into the neutral position after a carriage lowering operation has been terminated, the orifice 9b of the lift lock poppet 9 works as a resistance, with the result that it takes time to move the lift lock poppet 9, hence, to shut off the communication between the cylinder port 5 and the spool 2. With such an arrangement, when a carriage lifting operation is performed just after the carriage lowering operation has been terminated, hydraulic fluid flows back from the cylinder port 5 toward the suction port 3 to cause the carriage to sink because of a condition in which the pressure on the suction port 3 side has not been completely raised yet while at the same time the communication between the cylinder port 5 and the spool 2 has not been shut off yet. If the orifice 9b is made to have a larger diameter in order to solve this problem, another problem arises that the lift lock poppet 9 performs its opening operation at a higher speed and hence intensely collides with the plug 8a accommodating the lift lock poppet 9 therein to generate a high collision noise.

In order to solve the foregoing problems, the present invention intends to enhance the responsiveness of the lift lock poppet as well as to limit the collision noise generated when the lift lock poppet reaches an operating end.

Means for Solving the Problems

A fluid control valve according to the present invention is characterized by comprising: a main valve body having a sleeve to which a suction port for sucking hydraulic fluid, a discharge port for discharging hydraulic fluid and a cylinder port for delivering hydraulic fluid to a cylinder are connected; and a spool expandably and retractably fitted in the sleeve and capable of selectively assuming a lifting position for providing communication between the cylinder port and the suction port to form a flow channel of hydraulic fluid, a lowering position for providing communication between the cylinder port and the discharge port to form a flow channel of hydraulic fluid, and a neutral position for shutting off the flow channels between these ports, wherein: the main valve body further includes a high-pressure passage for providing communication between the suction port and the sleeve, a tank passage for providing communication between the discharge port and the sleeve, a lift lock poppet located between the sleeve and the cylinder port and capable of assuming an open position for providing communication between the sleeve and the cylinder port and a shutoff position for shutting off the communication between the sleeve and the cylinder port, a hydraulic fluid discharge passage for providing communication between a back-pressure chamber provided within the lift lock poppet and the sleeve, a hydraulic fluid delivery passage located between the sleeve and the lift lock poppet, and a cylinder passage located between the lift lock poppet and the cylinder port allowed to communicate with the hydraulic fluid delivery passage when the lift lock poppet is in the open position; and the spool has a communication passage for providing communication between the hydraulic fluid discharge passage and the hydraulic fluid delivery passage.

In this arrangement, the lift lock poppet is imparted with the function of the load check poppet also by making the orifice thereof have a larger diameter to allow the lift lock poppet to shut off a flow channel quickly upon termination of a lowering operation, while the spool has the communication passage for providing communication between the hydraulic fluid discharge passage and the hydraulic fluid delivery passage. For this reason, the fluid control valve can suppress a pressure change in the hydraulic fluid delivery passage which occurs in opening the lift lock poppet, by introducing hydraulic fluid from the cylinder passage into the hydraulic delivery passage via the communication passage. Therefore, it is possible to prevent the occurrence of an inconvenience that when the lift lock poppet reaches the operating end, a high impact noise is generated by a rapid opening operation of the lift lock poppet urged toward the open position side due to the pressure change. That is, it is possible to limit a pressure loss by eliminating the load check poppet to enable the lift lock poppet to perform a quick shut-off operation, thereby imparting the lift lock poppet with the function of the load check poppet, as well as to suppress the generation of a high impact noise which occurs when the lift lock poppet reaches the operating end.

Advantages of the Invention

The present invention is carried out in the form described above and has the following advantages.

That is, according to the present invention, the orifice provided at the outer periphery of the lift lock poppet is made to have a larger diameter in order to allow the lift lock poppet to shut off the flow channel quickly upon termination of the lowering operation, while the communication passage is provided for providing communication between the hydraulic fluid discharge passage and the hydraulic fluid delivery passage, whereby a pressure change in the hydraulic fluid delivery passage which occurs in opening the lift lock poppet can be suppressed by introducing hydraulic fluid from the cylinder passage into the hydraulic delivery passage via the communication passage. Therefore, it is possible to prevent the occurrence of the inconvenience that when the lift lock poppet reaches the operating end, a high impact noise is generated by a rapid opening operation of the lift lock poppet urged toward the open position side due to the pressure change. That is, it is possible to limit a pressure loss by eliminating the load check poppet to enable the lift lock poppet to perform a quick shut-off operation, thereby imparting the lift lock poppet with the function of the load check poppet, as well as to suppress the generation of a high impact noise which occurs when the lift lock poppet reaches the operating end.

DESCRIPTION OF SYMBOLS

Figure 1:
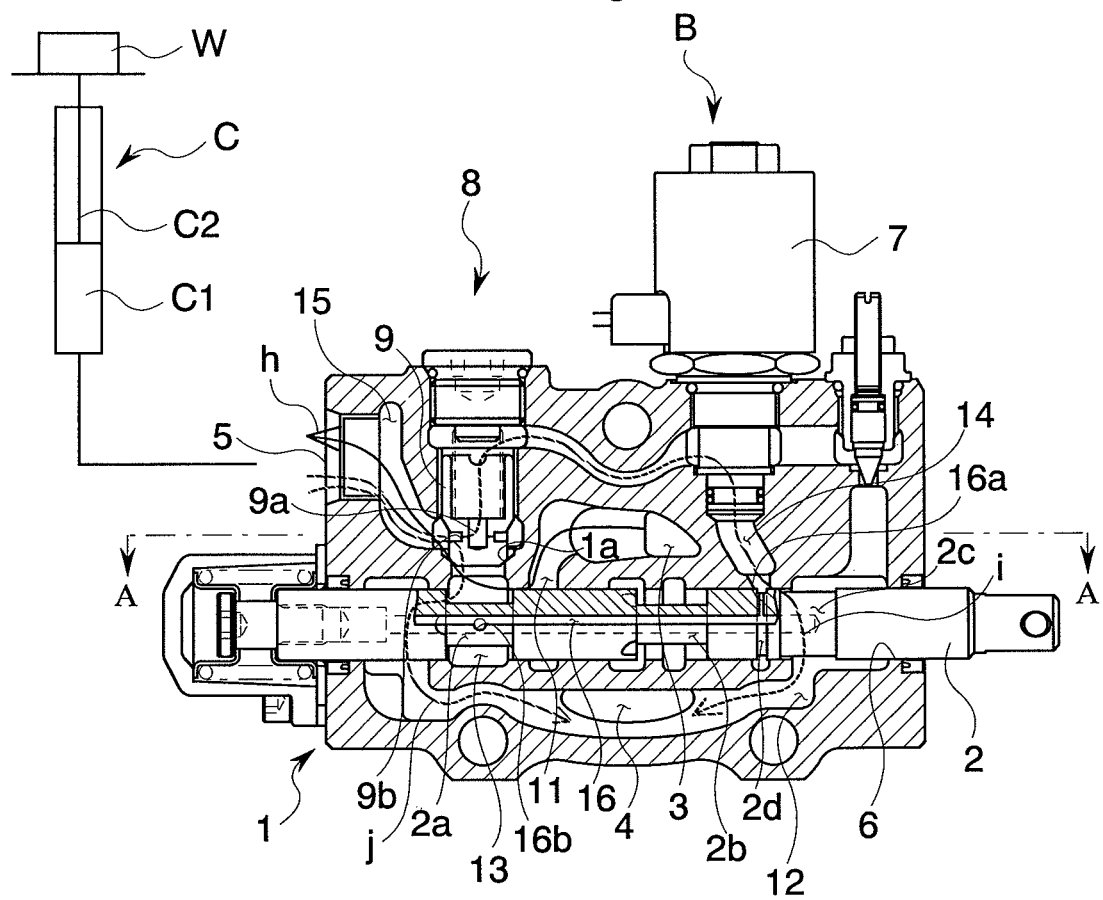
FIG. 1 is a sectional side elevational view illustrating a fluid control valve according to one embodiment of the present invention.

1 . . . main valve body
1a . . . poppet contact portion
2 . . . spool
2a . . . first annular groove
2b . . . second annular groove
2c . . . third annular groove
3 . . . suction port
4 . . . discharge port
5 . . . cylinder port
6 . . . sleeve
7 . . . electromagnetic solenoid valve
8 . . . operate check valve
8a . . . plug
9 . . . lift lock poppet
9a . . . back-pressure chamber
9b . . . orifice
9d . . . poppet spring
11 . . . high-pressure passage
12 . . . tank passage
13 . . . hydraulic fluid delivery passage
14 . . . hydraulic fluid discharge passage
15 . . . cylinder passage
16 . . . communication passage
16a . . . hydraulic fluid inlet
16b . . . hydraulic fluid outlet
20 . . . load check poppet
21 . . . spring
B . . . fluid control valve having an arrangement according to the present invention
BB . . . fluid control valve having a conventional arrangement
C . . . lift cylinder
C1 . . . bottom chamber
C2 . . . piston
h . . . hydraulic fluid flow
i . . . primary hydraulic fluid flow
j . . . secondary hydraulic fluid flow
W . . . load

BEST MODE FOR CARRYING OUT THE INVENTION

A preferred embodiment of the present invention will be described with reference to FIGS. 1 and 2. Here, like names and reference characters designate corresponding parts common to the foregoing conventional fluid control valve and the fluid control valve according to this embodiment.

The fluid control valve B according to the present embodiment is mounted on a forklift truck. FIG. 1 is a sectional side-elevational view illustrating an arrangement of the fluid control valve B, and FIG. 2 is a sectional view taken on line A-A of FIG. 1.

Specifically, the fluid control valve B has substantially the same arrangement as the foregoing conventional fluid control valve BB. That is, the fluid control valve B includes a main valve body 1 and a spool 2.

The main valve body 1 includes: a sleeve 6 to which a suction port 3 for sucking hydraulic fluid, a discharge port 4 for discharging hydraulic fluid and a cylinder port 5 for delivering hydraulic fluid to a lift cylinder C are connected; an electromagnetic solenoid valve 7 for opening and closing a flow channel between the cylinder port 5 and the discharge port 4; and an operate check valve 8 located between the sleeve 6 and the cylinder port 5 and having a lift lock poppet 9 therewithin for opening and closing a flow channel between the sleeve 6 and the cylinder port 5.

The spool 2 is expandably and retractably fitted in the sleeve 6 and configured to selectively assume a lifting position for providing communication between the cylinder port 5 and the suction port 3 to form a flow channel of hydraulic fluid, a lowering position for providing communication between the cylinder port 5 and the discharge port 4 to form a flow channel of hydraulic fluid, and a neutral position for shutting off the flow channels between these ports. The spool 2 is formed with first to third annular grooves 2a to 2c while being connected to a non-illustrated operating lever via a non-illustrated link mechanism. In FIG. 1, the spool 2 is illustrated as partially broken away.

Around the sleeve 6 of the main valve body 1, there are formed a high-pressure passage 11 connected to the suction port 3, a tank passage 12 connected to the discharge port 4, a hydraulic fluid delivery passage 13 which communicates with the high-pressure passage 11 via the first annular groove 2a when the spool 2 assumes the lifting position and which communicates with the tank passage 12 via the first annular groove 2a when the spool 2 assumes the lowering position, and a hydraulic fluid discharge passage 14 which communicates with the tank passage 12 via the third annular groove 2c when the spool 2 assumes the lowering position. The electromagnetic solenoid valve 7, which is located above the hydraulic fluid discharge passage 14, is always open during operation. The hydraulic fluid discharge passage 14 extends from the operate check valve 8 to the sleeve 6.

The operate check valve 8 includes the aforementioned lift lock poppet 9, and a plug 8a accommodating the lift lock poppet 9 therein. The lift lock poppet 9 is movable between an open position for providing communication between the cylinder port 5 and the hydraulic fluid delivery passage 13 and a shutoff position for shutting off the communication between the cylinder port 5 and the hydraulic fluid delivery passage 13. The lift lock poppet 9 has a back-pressure chamber 9a provided therewithin and an orifice 9b located at the outer periphery thereof for providing communication between the back-pressure chamber 9a and the outside. The back-pressure chamber 9a communicates with the hydraulic fluid discharge passage 14. A cylinder passage 15 is provided between the operate check valve 8 and the cylinder port 5. When the lift lock poppet 9 is in the open position, communication is provided between the cylinder passage 15 and the hydraulic fluid delivery passage 13. The communication between the cylinder passage 15 and the hydraulic fluid delivery passage 13 is shut off when the lift lock poppet 9 is in the shutoff position. More specifically, when the spool 2 assumes the neutral position, the lift lock poppet 9 is brought into contact with a poppet contact portion 1a of the main valve body 1 to shut off the communication between the hydraulic fluid delivery passage 13 and the cylinder passage 15. As described above, the lift lock poppet 9 has the back-pressure chamber 9a provided therewithin and the orifice 9b located at the outer periphery thereof for providing communication between the inside of the back-pressure chamber 9a and the cylinder passage 15. The orifice 9b is made to have a larger diameter than the orifice of the conventional fluid control valve BB. Also, the flow rate of hydraulic fluid passing through the electromagnetic solenoid valve 7 is set higher than in the conventional fluid control valve BB in order to ensure the same level of pressure difference between the cylinder passage 15 and the back-pressure chamber 9a as in the conventional fluid control valve BB.

In the present embodiment, the spool 2 is provided with a communication passage 16 providing communication between the hydraulic fluid discharge passage 14 and the hydraulic fluid delivery passage 13. Specifically, the spool 2 is hollow and the hollow portion is formed into the communication passage 16. More specifically, when the spool 2 is in a position intermediate the neutral position and the full open position for providing communication between the first annular groove 2a and the tank passage 12, the communication passage 16 communicates with the hydraulic fluid discharge passage 14 via a hydraulic fluid inlet 16a located at a longitudinal position on the spool 2 coinciding with the hydraulic fluid discharge passage 14 while communicating with the hydraulic fluid delivery passage 13 via a hydraulic fluid outlet 16b located at a longitudinal position on the spool 2 coinciding with the hydraulic fluid delivery passage 13. In the present embodiment, the spool 2 is formed with an annular guide groove 2d at a longitudinal position thereof coinciding with the hydraulic fluid inlet 16a for guiding hydraulic fluid to the hydraulic fluid inlet 16a.

Figure 2:
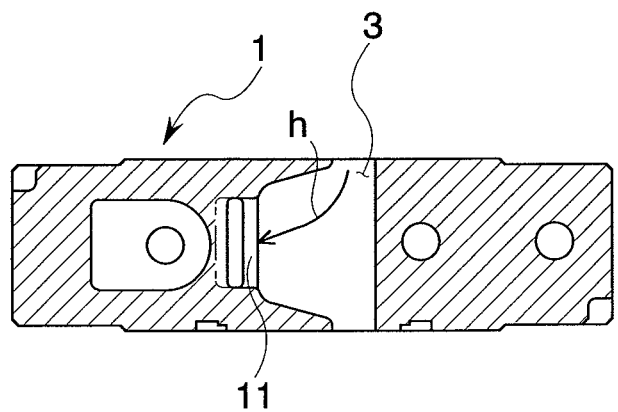
FIG. 2 is a sectional view taken on line A-A of FIG. 1.
Figure 3:
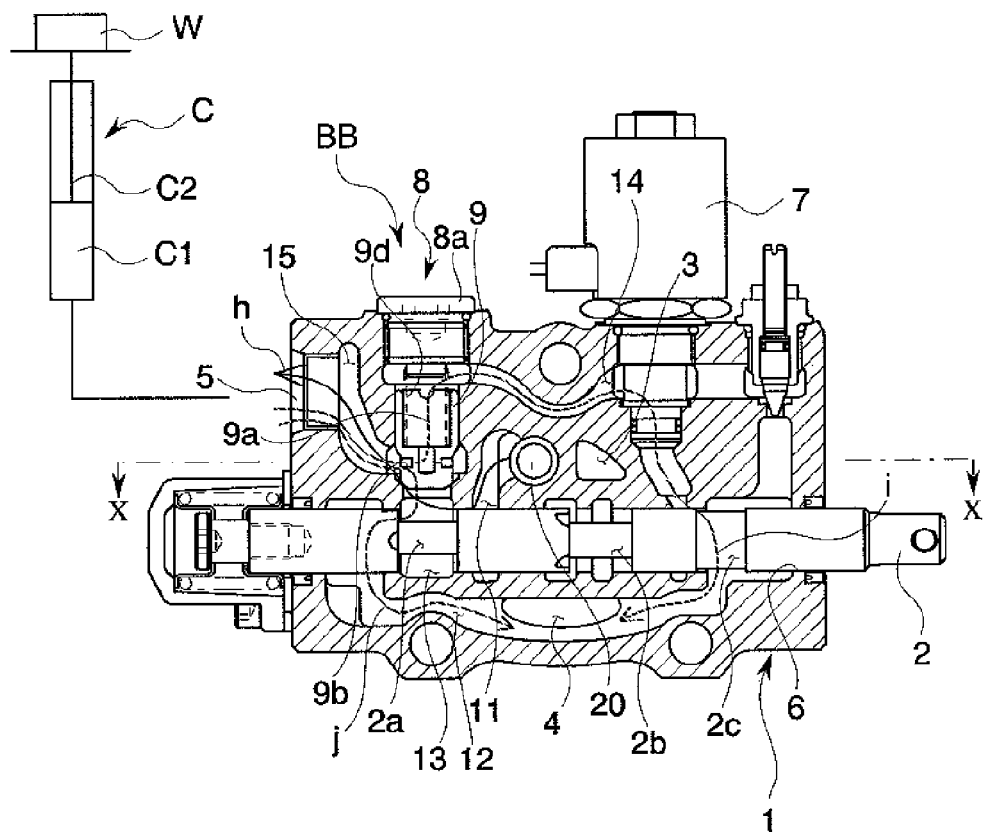
FIG. 3 is a sectional side elevational view illustrating a conventional fluid control valve.
Figure 4:
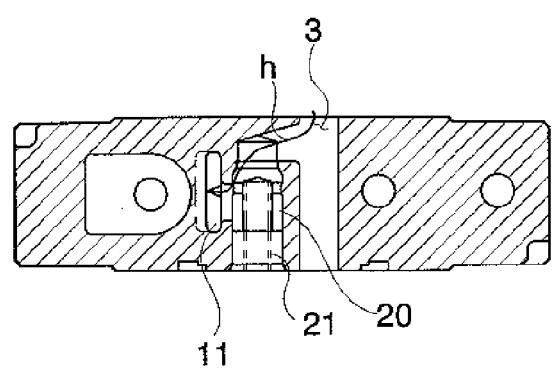
FIG. 4 is a sectional view taken on line X-X of FIG. 4.

With reference to FIGS. 1 and 2, description will be made of operations of respective portions of the fluid control valve B in moving the lift up and down. In moving the lift up, the spool 2 is moved rightwardly from the position illustrated (i.e., neutral position) to the lifting position. Accordingly, the first annular groove 2a shifts rightwardly to provide communication between the high-pressure passage 11 and the hydraulic fluid delivery passage 13 via the first annular groove 2a. As a result, a high hydraulic fluid pressure is applied to the lift lock poppet 9 from the hydraulic fluid delivery passage 13. When the lift lock poppet 9 is moved upwardly in FIG. 1 by the hydraulic fluid pressure thus applied thereto, communication is provided between the hydraulic fluid delivery passage 13 and the cylinder passage 15 to allow hydraulic fluid to be fed to the cylinder port 5 via the cylinder passage 15. Thus, high-pressure hydraulic fluid is supplied into a bottom chamber C1 of the lift cylinder C to move the lift up. With the lift in the moved-up position, when the spool 2 is moved back into the neutral position, the communication between the hydraulic fluid delivery passage 13 and the high-pressure passage 11 is shut off, while at the same time the lift lock poppet 9 moves downwardly in FIG. 1 to shut off the communication between the hydraulic fluid delivery passage 13 and the cylinder passage 15. Thus, the lift cylinder C is kept in the position described above. When the pressure at the suction port 3 is not raised sufficiently as compared with the pressure at the cylinder port 5 in spite of the spool 2 moved toward the lifting position, the lift lock poppet 9 remains unopen and hence serves as a load check mechanism for preventing the lift from moving down due to a backflow of hydraulic fluid.

In moving the lift down, on the other hand, the spool 2 is moved leftwardly to the lowering position. By so doing, the hydraulic fluid discharge passage 14 is allowed to communicate with the tank passage 12 via the third annular groove 2c. That is, the back-pressure chamber 9a is allowed to communicate with the tank passage 12. On the other hand, the pressure caused by a load W and the weight of a piston C2 is imposed on the bottom chamber C1 of the lift cylinder C and hence is exerted on the lower portion of the lift lock poppet 9 via the cylinder port 5 and the cylinder passage 15. At that time, hydraulic fluid is fed from the cylinder port 5 into the cylinder passage 15 and then introduced into the back-pressure chamber 9a via the orifice 9b of the lift lock poppet 9. This results in a pressure difference between the cylinder passage 15 and the back-pressure chamber 9a. While the spool 2 moves from the neutral position to reach the lowering position completely, the hydraulic fluid inlet 16a of the communication passage 16 communicates with the hydraulic fluid discharge passage 14 to introduce hydraulic fluid from the hydraulic fluid discharge passage 14 partially into the hydraulic fluid delivery passage 13 through the hydraulic fluid outlet 16b via the communication passage 16. Thereafter, the pressure difference between the cylinder passage 15 and the back-pressure chamber 9a causes the poppet 9 to move upwardly in FIG. 1 into the open position, so that hydraulic fluid in the bottom chamber C1 of the lift cylinder C flows into the tank passage 12 via the hydraulic fluid delivery passage 13 and the first annular groove 2a of the spool 2, thereby causing the lift cylinder C to perform the lowering operation. With the lift cylinder C in the lowered position, when the spool 2 is moved back into the neutral position, the communication between the hydraulic fluid discharge passage 14 and the tank passage 12 is shut off. As a result, the pressure difference between the cylinder passage 15 and the back-pressure chamber 9a disappears, which allows the lift lock poppet 9 to move into the shutoff position. Thus, the communication between the cylinder passage 15 and the hydraulic fluid delivery passage 13 is also shut off. Since the orifice 9b for providing communication between the poppet back-pressure chamber 9a and the cylinder passage 15 is made to have a larger diameter than the orifice of the conventional fluid control valve, the lift lock poppet 9 moves against a reduced resistance and, hence, the speed of the lift lock poppet 9 moving downwardly in FIG. 1, i.e., toward the shutoff position, is higher than in the conventional flow control valve, whereby the communication between the cylinder passage 15 and the hydraulic fluid delivery passage 13 is shut off more quickly. Therefore, even when the spool 2 is moved into the lifting position just after the lift has been moved down, the lift lock poppet 9 continues to shut off the communication between the cylinder passage 15 and the hydraulic fluid delivery passage 13 until the pressure of hydraulic fluid from the hydraulic fluid delivery passage 13 becomes sufficiently high, thereby preventing the lift from sinking due to a backflow of hydraulic fluid. Thus, the lift lock poppet 9 functions as a load check poppet also. On the other hand, during the time period in which the spool 2 moves from the neutral position to reach the lowering position completely, i.e., the time period from the starting of movement of the spool 2 until the poppet 9 reaches the open position by upward movement in FIG. 1, hydraulic fluid is fed into the hydraulic fluid delivery passage 13 via the guide annular groove 2d and the communication passage 16, as described above. For this reason, the difference between the hydraulic pressure in the cylinder passage 15 and the hydraulic pressure in the hydraulic fluid delivery passage 13 is smaller than that in the conventional fluid control valve BB and, therefore, the pressure change in the hydraulic fluid delivery passage 13 which results from the movement of the poppet 9 to the open position is smaller than in the conventional fluid control valve BB. Since the pressure change is small, the biasing force urging the poppet 9 from the hydraulic fluid delivery passage 13 side toward the open position side is also small.

With the arrangement of the fluid control valve B according to the present embodiment, it is possible to reduce the pressure loss by eliminating the load check poppet as well as to quickly shut off the communication between the cylinder passage 15 and the hydraulic fluid delivery passage 13 after termination of the lift moving-down operation by making the orifice 9b of the lift lock poppet 9 have a larger diameter than in the conventional fluid control valve. Thus, the lift lock poppet 9 can be imparted with the function of the load check poppet for preventing the lift from sinking due to a backflow of hydraulic fluid which occurs when the lift moving-up operation is performed just after the lift moving-down operation. Further, since the communication passage 16 is formed in the spool 2 to allow hydraulic fluid from the cylinder passage 15 to be introduced into the hydraulic fluid delivery passage 13 via the hydraulic fluid discharge passage 14 and the communication passage 16, a large pressure change fails to occur in the hydraulic fluid delivery passage 13 when the lift lock poppet 9 opens. Therefore, it is possible to prevent the occurrence of the inconvenience that a high impact noise is generated by a rapid opening operation of the lift lock poppet 9 urged toward the open position side due to the pressure change. Moreover, since the hollow portion of the spool 2 is formed into the communication passage 16, the communication passage 16 can be formed by easy machining using a drill or the like. Also, the hydraulic fluid inlet 16a and hydraulic fluid outlet 16b for providing communication between the communication passage 16 and the outside of the communication passage 16 can be formed by easy machining using a drill or the like. That is, the effect of preventing the occurrence of the inconvenience that a high impact noise is generated can be realized by a simple arrangement and easy machining without the need to provide special parts.

The present invention is not limited to the foregoing embodiment.

For example, the cylinder passage 15 and the hydraulic fluid discharge passage 14 need not always communicate with each other. The communication therebetween is simply provided at least when the spool 2 is in a position at which the lift lock poppet begins to open in the lift moving-down operation.

The annular guide groove 2d need not necessarily be provided in the foregoing embodiment as long as a phase adjustment is made to the spool 2 so as to allow the hydraulic fluid inlet 16a to communicate with the hydraulic fluid discharge passage 14 reliably.

The foregoing embodiment may be modified variously without departing from the concept of the present invention.

INDUSTRIAL APPLICABILITY

According to the present invention, the lift lock poppet is enabled to shut off the flow channel quickly upon termination of the lowering operation by making the orifice formed at the outer periphery thereof have a larger diameter, while the communication passage allows the hydraulic fluid discharge passage and the hydraulic fluid delivery passage to communicate with each other. For this reason, by making use of the present invention, it is possible to reduce the pressure change which occurs in the hydraulic fluid delivery passage when the lift lock poppet starts opening, hence, suppress the occurrence of the inconvenience that a high collision noise is generated by the lift lock poppet urged to intensely collide with the operating end due to the pressure change.

The invention claimed is:

1. A fluid control valve comprising:
   a main valve body having a sleeve to which a suction port for sucking hydraulic fluid, a discharge port for discharging hydraulic fluid and a cylinder port for delivering hydraulic fluid to a cylinder are connected; and
   a spool expandably and retractably fitted in the sleeve and capable of selectively assuming a lifting position for providing communication between the cylinder port and the suction port to form a flow channel of hydraulic fluid, a lowering position for providing communication between the cylinder port and the discharge port to form a flow channel of hydraulic fluid, and a neutral position for shutting off the flow channels between these ports, wherein:
   the main valve body further includes a high-pressure passage for providing communication between the suction port and the sleeve, a tank passage for providing communication between the discharge port and the sleeve, a lift lock poppet located between the sleeve and the cylinder port and capable of assuming an open position for providing communication between the sleeve and the cylinder port and a shutoff position for shutting off the communication between the sleeve and the cylinder port, a hydraulic fluid discharge passage for providing communication between a back-pressure chamber provided within the lift lock poppet and the sleeve, a hydraulic fluid delivery passage located between the sleeve and the lift lock poppet, and a cylinder passage located between the lift lock poppet and the cylinder port and allowed to communicate with the hydraulic fluid delivery passage when the lift lock poppet is in the open position; and
   the spool has a communication passage for providing communication between the hydraulic fluid discharge passage and the hydraulic fluid delivery passage when the spool is provided at an intermediate position between the neutral position and the lowering position;
   a pressure in the cylinder passage and a pressure in the hydraulic delivery passage become nearly equal due to the communication between the hydraulic fluid discharge passage and the hydraulic fluid delivery passage while the spool moves from the neutral position to the lowering position completely.

2. The fluid control valve according to claim 1, the communication passage including a hydraulic fluid inlet and a hydraulic fluid outlet, and the hydraulic fluid inlet of the communication passage communicates with the hydraulic fluid discharge passage to introduce hydraulic fluid into the hydraulic fluid delivery passage through the hydraulic fluid outlet of the communication passage.

* * * * *